US012767845B2

(12) United States Patent
Sato et al.

(10) Patent No.: US 12,767,845 B2
(45) Date of Patent: Oct. 20, 2026

(54) INK JET INK SET FOR IMPERMEABLE BASE MATERIAL IMAGE RECORDING METHOD, METHOD OF PRODUCING LAMINATE, IMAGE RECORDED MATERIAL, AND LAMINATE

(71) Applicant: FUJIFILM Corporation, Tokyo (JP)

(72) Inventors: Ayato Sato, Kanagawa (JP); Toshihiro Kariya, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 227 days.

(21) Appl. No.: 18/655,426

(22) Filed: May 6, 2024

(65) Prior Publication Data

US 2024/0287341 A1 Aug. 29, 2024

Related U.S. Application Data

(63) Continuation of application No. PCT/JP2022/039169, filed on Oct. 20, 2022.

(30) Foreign Application Priority Data

Nov. 15, 2021 (JP) ................................ 2021-185753

(51) Int. Cl.

| | |
|---|---|
| ***C09D 11/40*** | (2014.01) |
| ***B41J 2/01*** | (2006.01) |
| ***B41J 2/21*** | (2006.01) |
| ***B41M 5/00*** | (2006.01) |
| ***C09D 11/102*** | (2014.01) |
| ***C09D 11/322*** | (2014.01) |
| ***C09D 11/54*** | (2014.01) |

(52) U.S. Cl.

CPC ................ *C09D 11/40* (2013.01); *B41J 2/01* (2013.01); *B41J 2/2107* (2013.01); *C09D 11/102* (2013.01); *C09D 11/322* (2013.01); *C09D 11/54* (2013.01); *B41M 5/0017* (2013.01)

(58) Field of Classification Search

CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2017/0247561 | A1 | 8/2017 | Nakagawa et al. | |
| 2017/0314194 | A1* | 11/2017 | Arai | B41J 2/01 |
| 2018/0030301 | A1* | 2/2018 | Yamazaki | C09D 11/322 |
| 2018/0237987 | A1* | 8/2018 | Urano | C09D 11/40 |
| 2018/0265728 | A1 | 9/2018 | Hanazawa et al. | |
| 2019/0352528 | A1* | 11/2019 | Yamazaki | C09D 11/322 |
| 2020/0023648 | A1 | 1/2020 | Gotou et al. | |
| 2020/0369904 | A1 | 11/2020 | Fujii et al. | |
| 2020/0391533 | A1 | 12/2020 | Gotou | |
| 2021/0047531 | A1 | 2/2021 | Sato et al. | |
| 2023/0044967 | A1 | 2/2023 | Niizuma et al. | |
| 2023/0332009 | A1* | 10/2023 | Fujita | C09D 11/322 |
| 2023/0374327 | A1* | 11/2023 | Mizoe | B41J 2/2114 |

FOREIGN PATENT DOCUMENTS

| | | | |
|---|---|---|---|
| CN | 110997830 | A | 4/2020 |
| CN | 111727226 | A | 9/2020 |
| JP | 2017-019991 | A | 1/2017 |

(Continued)

OTHER PUBLICATIONS

Extended European Search Report dated Jul. 7, 2025 from the European Patent Office in Application No. 22892538.4.

(Continued)

*Primary Examiner* — Manish S Shah
(74) *Attorney, Agent, or Firm* — Sughrue Mion, PLLC

(57) ABSTRACT

Provided are an ink jet ink set for an impermeable base material, comprising: a pretreatment liquid that contains water and a urethane resin having a glass transition temperature of −55° C. to 50° C., and a colored ink that contains water, a pigment other than a white pigment, and a urethane resin, and an application thereof.

13 Claims, No Drawings

(56) References Cited

FOREIGN PATENT DOCUMENTS

| | | | |
|---|---|---|---|
| JP | 2018-024853 | A | 2/2018 |
| JP | 2018-94902 | A | 6/2018 |
| JP | 2018-154118 | A | 10/2018 |
| JP | 2019-094377 | A | 6/2019 |
| JP | 2019-151062 | A | 9/2019 |
| JP | 2020-011456 | A | 1/2020 |
| JP | 2020-199717 | A | 12/2020 |
| JP | 2021-024944 | A | 2/2021 |
| JP | 2022-087006 | A | 6/2022 |
| WO | 2021/157310 | A1 | 8/2021 |

OTHER PUBLICATIONS

International Search Report issued Jan. 10, 2023 in Application No. PCT/JP2022/039169.

Written Opinion issued Jan. 10, 2023 in Application No. PCT/JP2022/039169.

International Preliminary Report on Patentability (with translation of the Written Opinion) issued May 2, 2024 in Application No. PCT/JP2022/039169.

Communication dated Jan. 17, 2026 in Chinese Application No. 202280074385.9.

Communication dated Aug. 4, 2026, issued in Japanese Application No. 2023-559529.

Chinese Office Action dated Jul. 2, 2026, issued in Chinese application No. 202280074385.9.

* cited by examiner

INK JET INK SET FOR IMPERMEABLE BASE MATERIAL IMAGE RECORDING METHOD, METHOD OF PRODUCING LAMINATE, IMAGE RECORDED MATERIAL, AND LAMINATE

CROSS-REFERENCE TO RELATED APPLICATION

This application is a Continuation of International Application No. PCT/JP2022/039169, filed Oct. 20, 2022, which claims priority to Japanese Patent Application No. 2021-185753 filed Nov. 15, 2021. Each of the above applications is hereby expressly incorporated by reference, in its entirety, into the present application.

BACKGROUND OF THE INVENTION

1. Field of the Invention

The present disclosure relates to an ink jet ink set for an impermeable base material, an image recording method, a method of producing a laminate, an image recorded material, and a laminate.

2. Description of the Related Art

In the related art, various examinations have been conducted on image recording carried out using an ink.

For example, JP2018-154118A discloses a printing method including a treatment liquid applying step of applying a treatment liquid onto a recording medium and an ink applying step of applying an ink onto the recording medium, in which the treatment liquid contains a nonionic resin having a structural unit (a)-1, the nonionic resin has a glass transition temperature of 15° C. or lower, and the ink contains a nonionic resin having a structural unit (a)-1 and a coloring material. JP2020-11456A describes a printing method including a pretreatment step of coating a printed material with a pretreatment liquid and an ink jetting step of jetting an ink using a jetting head.

SUMMARY OF THE INVENTION

An image to be recorded is required to have adhesiveness to various base materials depending on the usage aspect.

A laminate may be produced by recording an image on an impermeable base material to obtain an image recorded material and laminating a base material for lamination on the image in the image recorded material. Further, the laminate may be required to improve the boiling resistance in a case where a boiling treatment is performed.

The present disclosure has been made in consideration of the above-described circumstances, and an object of one embodiment of the present disclosure is to provide an ink jet ink set for an impermeable base material and an image recording method, which enable an image recorded material with excellent boiling resistance to be obtained in a case where a base material for lamination is laminated on an image recorded material to produce a laminate and the laminate is subjected to a boiling treatment.

An object of another embodiment of the present disclosure is to provide a method of producing a laminate, which enables production of a laminate with excellent boiling resistance in a case where a boiling treatment is performed.

An object of still another embodiment of the present disclosure is to provide an image recorded material with excellent boiling resistance in a case where a laminate is subjected to a boiling treatment.

An object of even still another embodiment of the present disclosure is to provide a laminate with excellent boiling resistance in a case where a boiling treatment is performed.

The present disclosure includes the following aspects.

<1> An ink jet ink set for an impermeable base material, comprising: a pretreatment liquid that contains water and a urethane resin having a glass transition temperature of −55° C. to 50° C.; and a colored ink that contains water, a pigment other than a white pigment, and a urethane resin.

<2> The ink jet ink set for an impermeable base material according to <1>, in which the urethane resin contained in the colored ink is an anionic urethane resin.

<3> The ink jet ink set for an impermeable base material according to <1> or <2>, in which the urethane resin contained in the pretreatment liquid has a breaking elongation of 300% to 1,300%.

<4> The ink jet ink set for an impermeable base material according to any one of <1> to <3>, in which the urethane resin contained in the colored ink has a glass transition temperature of 50° C. or lower.

<5> The ink jet ink set for an impermeable base material according to any one of <1> to <4>, in which an absolute value of a difference between the glass transition temperature of the urethane resin contained in the pretreatment liquid and the glass transition temperature of the urethane resin contained in the colored ink is 50° C. or lower.

<6> The ink jet ink set for an impermeable base material according to any one of <1> to <5>, further comprising: a white ink that contains water and a white pigment.

<7> The ink jet ink set for an impermeable base material according to <6>, in which the white ink contains a urethane resin.

<8> The ink jet ink set for an impermeable base material according to <7>, in which the urethane resin contained in the white ink has a glass transition temperature of 50° C. or lower.

<9> The ink jet ink set for an impermeable base material according to any one of <6> to <8>, in which an absolute value of a difference between a glass transition temperature of the urethane resin contained in the colored ink and a glass transition temperature of a urethane resin contained in the white ink is 50° C. or lower.

<10> An image recording method using the ink jet ink set according to any one of <1> to <5>, the method comprising: a step of applying the pretreatment liquid onto an impermeable base material; and a step of applying the colored ink onto the impermeable base material onto which the pretreatment liquid has been applied by an ink jet recording method.

<11> An image recording method using the ink jet ink set for an impermeable base material according to any one of <6> to <9>, the method comprising: a step of applying the pretreatment liquid onto an impermeable base material; and a step of applying the colored ink and the white ink onto the impermeable base material onto which the pretreatment liquid has been applied by an ink jet recording method.

<12> A method of producing a laminate, comprising: a step of obtaining an image recorded material that includes the impermeable base material and an image disposed on the impermeable base material by the image recording method according to <10> or <11>; and a step of laminating a base material for lamination on a side of the image recorded material where the image has been disposed, to obtain a laminate.

<13> An image recorded material comprising: an impermeable base material; and an image disposed on the impermeable base material, in which the image includes a pretreatment layer disposed on the impermeable base material and containing a urethane resin having a glass transition temperature of −55° C. to 50° C., and a colored ink layer disposed on the pretreatment layer and containing a pigment other than a white pigment and a urethane resin.

<14> The image recorded material according to <13>, in which the image further includes a white ink layer disposed on the colored ink layer and containing a white pigment.

<15> A laminate comprising: the image recorded material according to <13> or <14>; and a base material for lamination that is laminated on the image of the image recorded material.

According to an embodiment of the present disclosure, it is possible to provide an ink jet ink set for an impermeable base material and an image recording method, which enable an image recorded material with excellent boiling resistance to be obtained in a case where a base material for lamination is laminated on an image recorded material to produce a laminate and the laminate is subjected to a boiling treatment.

According to another embodiment of the present disclosure, it is possible to provide a method of producing a laminate, which enables production of a laminate with excellent boiling resistance in a case where a boiling treatment is performed.

According to still another embodiment of the present disclosure, it is possible to provide an image recorded material with excellent boiling resistance in a case where a laminate is subjected to a boiling treatment.

According to even still another embodiment of the present disclosure, it is possible to provide a laminate with excellent boiling resistance in a case where a boiling treatment is performed.

DESCRIPTION OF THE PREFERRED EMBODIMENTS

Hereinafter, an ink jet ink set for an impermeable base material, an image recording method, a method of producing a laminate, an image recorded material, and a laminate according to the present disclosure will be described in detail.

In the present specification, a numerical range shown using "to" indicates a range including the numerical values described before and after "to" as a minimum value and a maximum value, respectively.

In a numerical range described in a stepwise manner in the present specification, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present specification, a combination of two or more preferred embodiments is a more preferred embodiment.

In the present disclosure, the meaning of the term "step" includes not only an independent step but also a step whose intended purpose is achieved even in a case where the step is not clearly distinguished from other steps.

In the present specification, the term "image" denotes an entire film formed by applying a pretreatment liquid and an ink in this order, and the term "image recording" denotes formation of an image (that is, the film).

Further, the concept of "image" in the present specification also includes a solid image.

In the present specification, the concept of "(meth)acrylate" includes both acrylate and methacrylate. In addition, the concept "(meth)acryl" includes both acryl and methacryl.

In the present specification, the term "boiling treatment" denotes a treatment of immersing an object (specifically, a laminate) in water at 60° C. to 100° C. and heating the object for a certain time (for example, 10 minutes to 120 minutes).

[Ink Jet Ink Set for Impermeable Base Material]

An ink jet ink set for an impermeable base material according to the present disclosure (hereinafter, also referred to as "ink set according to the present disclosure") includes a pretreatment liquid that contains water and a urethane resin having a glass transition temperature of −55° C. to 50° C., and a colored ink that contains water, a pigment other than a white pigment, and a urethane resin.

The ink set of the present disclosure is used only for an impermeable base material. That is, the ink set of the present disclosure is an ink set used for recording an image on an impermeable base material. The details of the impermeable base material will be described below. Among these, it is preferable that the impermeable base material is a resin base material and that the ink set of the present disclosure is used for a resin base material.

According to the ink set of the present disclosure, it is possible to obtain an image recorded material including an impermeable base material and an image recorded on the impermeable base material, in which the image recorded material has excellent boiling resistance even in a case where a base material for lamination is laminated on the image to produce a laminate and the laminate is subjected to a boiling treatment.

Here, the boiling resistance denotes a property that failure such as peeling or the like is unlikely to occur between the base material for lamination and the image recorded material in the laminate [that is, a laminate having a laminated structure of "the base material for lamination/the image recorded material" (specifically, a laminated structure of "the base material for lamination/the image/the impermeable base material") formed by the above-described lamination.

The reason why the above-described effects are exhibited by the ink set of the present disclosure is presumed as follows.

In order to improve the boiling resistance in the laminate, it is necessary to improve the adhesiveness between the impermeable base material and the image and to improve the adhesiveness between the image and the base material for lamination as a premise.

Typically, in a case where the laminate is subjected to a boiling treatment, each of the impermeable base material and the pretreatment layer formed by application to the pretreatment liquid is swollen by being heated and shrinks after the completion of the boiling treatment. Since the impermeable base material and the pretreatment layer have different shrinkage ratios, an internal stress is generated, and thus peeling is likely to occur between the impermeable base material and the pretreatment layer.

On the contrary, in the ink set of the present disclosure, since the pretreatment liquid contains a urethane resin having a glass transition temperature of −55° C. to 50° C., the internal stress generated by the boiling treatment can be reduced, and thus the boiling resistance is improved. Further, since both the pretreatment liquid and the colored ink contain a urethane resin, the adhesiveness between the pretreatment layer and the colored ink layer formed by the application of the colored ink is also high, and thus the boiling resistance is improved.

Meanwhile, the ink set described in JP2018-154118A uses paper as a recording medium, and the technical idea thereof is different from that of the present disclosure. Further, in the ink set described in JP2020-11456A, the pretreatment liquid does not contain a urethane resin having a glass transition temperature of −55° C. to 50° C., and thus the boiling resistance is considered to be insufficient.

Hereinafter, each component contained in the pretreatment liquid and the ink of the ink set according to the embodiment of the present disclosure will be described.

[Ink Set]

The ink set of the present disclosure includes a pretreatment liquid and a colored ink. Hereinafter, "ink set" including a pretreatment liquid and a colored ink will also be referred to as "first ink set".

<Pretreatment Liquid>

The pretreatment liquid in the ink set of the present disclosure contains water and a urethane resin having a glass transition temperature of −55° C. to 50° C.

(Urethane Resin Having Glass Transition Temperature of −55° C. to 50° C.)

The pretreatment liquid included in the ink set of the present disclosure contains a urethane resin having a glass transition temperature of −55° C. to 50° C. (hereinafter, also referred to as "urethane resin P"). The pretreatment liquid may contain one or two or more kinds of urethane resins P.

Since the glass transition temperature of the urethane resin P is −55° C. or higher, the pretreatment layer formed by the application of the pretreatment liquid has high strength and excellent boiling resistance. Further, since the glass transition temperature of the urethane resin P is 50° C. or lower, internal stress generated by the boiling treatment is small and the boiling resistance is excellent.

From the viewpoint of further improving the boiling resistance, the glass transition temperature of the urethane resin P is preferably in a range of −55° C. to 20° C. and more preferably in a range of −55° C. to 0° C.

In the present disclosure, the glass transition temperature is measured using a differential scanning calorimeter, for example, "DSC-60" (product name, manufactured by Shimadzu Corporation).

From the viewpoint of further improving the boiling resistance, the urethane resin P has a breaking elongation of preferably 300% to 1,300%, and more preferably 600% to 1,300%. In a case where the breaking elongation of the urethane resin P is in a range of 300% to 1,300%, the internal stress generated by the boiling treatment can be reduced, and the boiling resistance is improved.

In the present disclosure, the breaking elongation is measured by the following method.

An aqueous solution or an aqueous dispersion liquid of a urethane resin is added to a container made of TEFLON (registered trademark) with a bottom area of 50 mm×100 mm and a height of 30 mm, dried at 25° C. for 24 hours, and further dried at 80° C. for 6 hours, thereby obtaining a resin film with a thickness of 500 m. A sample with a size of 10 mm×50 mm is cut out from the resin film and subjected to a tensile test using a precision universal testing machine (product name, "AUTOGRAPH AG-IS", manufactured by Shimadzu Corporation), and the breaking elongation is measured in conformity with JIS K 6251:2017 (ISO 37:2011).

In the present disclosure, the urethane resin denotes a polymer having a urethane bond. The urethane resin is synthesized, for example, by reacting a diol compound with a diisocyanate compound. For details of the diol compound and the diisocyanate compound, for example, the description in paragraphs 0031 to 0036 of JP2001-247787A can be referred to. Among the examples, a polyester-based urethane resin having an ester bond in the main chain, a polycarbonate-based urethane resin having a carbonate bond in the main chain, or a polyether-based urethane resin having an ether bond in the main chain is preferable as the urethane resin P.

The urethane resin P may be a water-soluble urethane resin that is dissolved in water or in the form of urethane resin particles that are present by being dispersed in water. Among these, from the viewpoint of increasing the strength of the pretreatment layer, it is preferable that the urethane resin P is in the form of urethane resin particles.

In a case where the urethane resin P is in the form of urethane resin particles, from the viewpoint of jetting stability, the urethane resin P has an average particle diameter of preferably 1 nm to 200 nm, more preferably 3 nm to 200 nm, and still more preferably 50 nm to 150 nm. Further, the average particle diameter thereof is determined by measuring the volume average particle diameter using a particle size distribution measuring device, for example, "NANOTRAC UPA-EX150" (product name, manufactured by Nikkiso Co., Ltd.) by a dynamic light scattering method.

The urethane resin P may be any of anionic, cationic, or nonionic.

The weight-average molecular weight of the urethane resin P is not particularly limited, but is preferably in a range of 1,000 to 300,000, more preferably in a range of 2,000 to 200,000, and still more preferably in a range of 10,000 to 150,000.

In the present disclosure, the weight-average molecular weight (Mw) is measured by gel permeation chromatography (GPC). The measurement according to GPC is performed by connecting three columns of TSKgeL Super HZM-H, TSKgeL Super HZ4000, and TSKgel Super HZ2000 (all trade names, manufactured by Tosoh Corporation) in series using HLC-8220GPC (manufactured by Tosoh Corporation) and tetrahydrofuran (THF) as an eluent. Further, the measurement is performed under conditions of a sample concentration of 0.45% by mass, a flow rate of 0.35 ml/min, a sample injection volume of 10 μl, and a measurement temperature of 40° C. using a differential refractive index detector. Further, the calibration curve is prepared using eight samples of "1F-40", "F-20", "F-4", "F-1", "A-5000", "A-2500", "A-1000", and "n-propylbenzene" which are "Standard Samples TSK standard, polystyrene" (manufactured by Tosoh Corporation).

A commercially available product may be used as the urethane resin P. Examples of the commercially available product include SUPERFLEX Series (manufactured by DKS Co., Ltd.), PERMARIN UA Series and UCOAT Series (manufactured by Sanyo Chemical Industries, Ltd.), TAKE-LAC Series (manufactured by Mitsui Chemicals, Inc.), and PUE Series (manufactured by Murayama Chemical Laboratory Co., Ltd.).

The content of the urethane resin P is preferably in a range of 1% by mass to 20% by mass and more preferably in a range of 5% by mass to 15% by mass with respect to the total amount of the pretreatment liquid.

(Water)

The pretreatment liquid in the ink set of the present disclosure contains water. The content of water is not particularly limited and is, for example, in a range of 50% by mass to 90% by mass.

(Organic Solvent)

It is preferable that the pretreatment liquid in the ink set of the present disclosure contains an organic solvent. The pretreatment liquid may contain only one or two or more kinds of organic solvents.

The kind of the organic solvent is not limited, and examples thereof include a monoalcohol having 1 to 4 carbon atoms; a diol such as 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; a triol such as glycerin, 1,2,6-hexanetriol, or trimethylolpropane; alkylene glycol such as ethylene glycol or propylene glycol; alkylene glycol monoalkyl ether such as ethylene glycol monoalkyl ether or propylene glycol monoalkyl ether; polyalkylene glycol such as diethylene glycol, triethylene glycol, tetraethylene glycol, pentaethylene glycol, dipropylene glycol, or polyoxyethylene polyoxypropylene glycol; polyalkylene glycol ether such as diethylene glycol monoalkyl ether, triethylene glycol monoalkyl ether, tripropylene glycol monoalkyl ether, or polyoxypropylene glyceryl ether; and 2-pyrrolidone, and N-methyl-2-pyrrolidone.

The content of the organic solvent is preferably in a range of 1% by mass to 20% by mass and more preferably in a range of 3% by mass to 10% by mass with respect to the total amount of the pretreatment liquid.

(Surfactant)

It is preferable that the pretreatment liquid in the ink set of the present disclosure contains a surfactant. The pretreatment liquid may contain only one or two or more kinds of surfactants.

The kind of the surfactant is not particularly limited, and may be any of an anionic surfactant, a cationic surfactant, a betaine-based surfactant, or a nonionic surfactant. Further, examples of the surfactant include an acrylic surfactant, a fluorine-based surfactant, and a silicone-based surfactant.

The content of the surfactant is preferably in a range of 0.1% by mass to 5% by mass and more preferably in a range of 0.2% by mass to 1% by mass with respect to the total amount of the pretreatment liquid.

(Aggregating Agent)

The pretreatment liquid in the ink set of the present disclosure may contain an aggregating agent from the viewpoint of improving the image quality (particularly, the character quality). The aggregating agent is not particularly limited as long as the aggregating agent is a component that aggregates the components in the colored ink. The aggregating agent contains preferably at least one selected from the group consisting of a polyvalent metal compound, an organic acid, a metal complex, and a cationic polymer and more preferably an organic acid. Preferred examples of the aggregating agent also include the aggregating agents described in paragraphs 0122 to 0130 of WO2020/195360A.

The pretreatment liquid may contain only one or two or more kinds of aggregating agents.

In a case where the pretreatment liquid contains an aggregating agent, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total mass of the pretreatment liquid.

(Other Components)

The pretreatment liquid may contain other components as necessary in addition to the above-described components. Examples of other components that may be contained in the pretreatment liquid include known additives such as a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties)

The pH of the pretreatment liquid is preferably in a range of 5.0 to 9.0 and more preferably in a range of 6.0 to 8.0. The pH is measured at 25° C. using a pH meter, for example, a pH meter (model number "HM-31", manufactured by DKK-TOA CORPORATION).

From the viewpoint of the coating properties of the pretreatment liquid, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer. The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

<Colored Ink>

The colored ink in the ink set of the present disclosure contains water, a pigment other than a white pigment, and a urethane resin.

(Pigment Other than White Pigment)

The colored ink in the ink set of the present disclosure contains a pigment other than a white pigment (hereinafter, also referred to as "color pigment"). The second ink may contain one or two or more kinds of color pigments. Further, the details of the white pigment will be described below.

The color pigment denotes a chromatic pigment or a black pigment, and may be typically any of a commercially available organic pigment or a commercially available inorganic pigment. Examples of the color pigment include pigments described in "Encyclopedia of Pigments" edited by Seishiro Ito (2000), "Industrial Organic Pigments", W. Herbst, K. Hunger, JP2002-12607A, JP2002-188025A, JP2003-26978A, and JP2003-342503A.

Further, the color pigment may be a water-insoluble pigment that can be dispersed in water by a dispersing agent, or may be a self-dispersing pigment. The self-dispersing pigment is a pigment that can be dispersed in water without using a dispersing agent. The self-dispersing pigment is, for example, a compound in which at least one selected from the group consisting of hydrophilic groups such as a carbonyl group, a hydroxyl group, a carboxyl group, a sulfo group, and a phosphoric acid group and salts thereof is chemically bonded to a surface of a pigment directly or via another group.

The kind of the color pigment is not particularly limited, and examples thereof include a cyan pigment, a magenta pigment, a yellow pigment, and a black pigment.

From the viewpoints of the image density and the jettability of the ink, the content of the color pigment is preferably in a range of 1% by mass to 20% by mass, more preferably in a range of 1% by mass to 15% by mass, and still more preferably in a range of 1% by mass to 10% by mass with respect to the total amount of the colored ink.

(Urethane Resin)

The colored ink in the ink set of the present disclosure contains a urethane resin. The colored ink may contain only one or two or more kinds of urethane resins. Hereinafter, the urethane resin contained in the colored ink will also be referred to as "urethane resin C".

The urethane resin C has a glass transition temperature of preferably 50° C. or lower and more preferably 0° C. or lower. In a case where the glass transition temperature thereof is 50° C. or lower, the internal stress generated by the boiling treatment is small, and thus the boiling resistance is excellent. The lower limit of the glass transition temperature of the urethane resin C contained in the colored ink is not particularly limited, and is, for example, −70° C. The glass transition temperature of the urethane resin C can be measured by the same method as that for the glass transition temperature of the urethane resin P.

An absolute value of a difference between the glass transition temperature of the urethane resin P and the glass transition temperature of the urethane resin C is preferably 50° C. or lower and more preferably 30° C. or lower. The lower limit of the absolute value of the difference is not particularly limited and is, for example, 0° C.

In a case where the absolute value of the difference is 50° C. or lower, the internal stress is unlikely to be generated at an interface between the pretreatment layer formed by the application of the pretreatment liquid and the colored ink layer formed by the application of the colored ink, and thus the boiling resistance is excellent.

A polyester-based urethane resin having an ester bond in the main chain, a polycarbonate-based urethane resin having a carbonate bond in the main chain, or a polyether-based urethane resin having an ether bond in the main chain is preferable as the urethane resin C.

The urethane resin C may be a water-soluble urethane resin that is dissolved in water or in the form of urethane resin particles that are present by being dispersed in water. Among these, from the viewpoint of increasing the strength of the colored ink layer formed by the application of the colored ink, it is preferable that the urethane resin C is in the form of urethane resin particles.

In a case where the urethane resin C is in the form of urethane resin particles, from the viewpoint of jetting stability, the urethane resin C has an average particle diameter of preferably 1 nm to 200 nm, more preferably 3 nm to 200 nm, and still more preferably 5 nm to 50 nm. The average particle diameter of the urethane resin C can be measured by the same method as that for the average particle diameter of the urethane resin P.

The urethane resin C may be any of anionic, cationic, or nonionic. From the viewpoint of improving storage stability of the colored ink, it is preferable that the urethane resin C is an anionic urethane resin.

The weight-average molecular weight (Mw) of the urethane resin C is not particularly limited, but is preferably in a range of 1,000 to 300,000, more preferably in a range of 2,000 to 200,000, and still more preferably in a range of 10,000 to 150,000. The Mw of the urethane resin C can be measured by the same method as that for the Mw of the urethane resin P.

A commercially available product may be used as the urethane resin C. Examples of the commercially available product include SUPERFLEX Series (manufactured by DKS Co., Ltd.), PERMARIN UA Series and UCOAT Series (manufactured by Sanyo Chemical Industries, Ltd.), TAKELAC Series (manufactured by Mitsui Chemicals, Inc.), and PUE Series (manufactured by Murayama Chemical Laboratory Co., Ltd.).

The content of the urethane resin C is preferably in a range of 1% by mass to 20% by mass and more preferably in a range of 5% by mass to 10% by mass with respect to the total amount of the colored ink.

(Water)

The colored ink in the ink set of the present disclosure contains water. The content of water is not particularly limited and is, for example, in a range of 40% by mass to 70% by mass.

(Pigment Dispersing Resin)

In a case where the color pigment contained in the colored ink is not a self-dispersing pigment that can be dispersed in water, it is preferable that the colored ink further contains a resin (hereinafter, also referred to as "pigment dispersing resin") as a dispersing agent having a function of dispersing the pigment. In a case where the color pigment is a self-dispersing pigment, the color pigment may contain no pigment dispersing resin.

The pigment dispersing resin is typically contained in a pigment dispersion liquid by being mixed with the color pigment in advance. The dispersing resin may be appropriately selected from known dispersing agents of the related art, and may be a random copolymer or a block copolymer. Further, the pigment dispersing resin may have a crosslinking structure.

Among these, it is preferable that the pigment dispersing resin is a random copolymer.

It is preferable that the random copolymer has a structural unit derived from a hydrophobic monomer and a structural unit derived from a monomer containing an anionic group (hereinafter, referred to as "anionic group-containing monomer"). From the viewpoint of dispersion stability, the content ratio (a:b) of a structural unit a derived from a hydrophobic monomer to a structural unit b derived from an anionic group-containing monomer is preferably in a range of 8:1 to 1:1.

The structural unit contained in the random copolymer and derived from a hydrophobic monomer may be used alone or two or more kinds thereof.

The structural unit contained in the random copolymer and derived from an anionic group-containing monomer may be used alone or two or more kinds thereof.

The hydrophobic monomer includes preferably a monomer containing a hydrocarbon group having 4 or more carbon atoms, more preferably an ethylene unsaturated monomer containing a hydrocarbon group having 4 or more carbon atoms, and still more preferably a (meth)acrylate containing a hydrocarbon group having 4 or more carbon atoms. The hydrocarbon group may be any of a chain-like hydrocarbon group, an alicyclic hydrocarbon group, or an aromatic hydrocarbon group. The number of carbon atoms of the hydrocarbon group is more preferably 6 or more and still more preferably 10 or more. The upper limit of the number of carbon atoms of the hydrocarbon group is, for example, 20.

Examples of the (meth)acrylate containing a chain-like hydrocarbon group having 4 or more carbon atoms include n-butyl (meth)acrylate, 2-ethylhexyl (meth)acrylate, octyl (meth)acrylate, lauryl (meth)acrylate, and stearyl (meth) acrylate. The number of carbon atoms in the chain-like hydrocarbon group is preferably 6 or more, more preferably 8 or more, and particularly preferably 12 or more. Among these, it is preferable that the ethylene unsaturated monomer containing a chain-like hydrocarbon group having 4 or more carbon atoms is lauryl (meth)acrylate or stearyl (meth) acrylate.

Examples of the (meth)acrylate containing an alicyclic hydrocarbon group having 4 or more carbon atoms include (bicyclo [2.2.1]heptyl-2) (meth)acrylate, 1-adamantyl (meth)acrylate, 2-adamantyl (meth)acrylate, 3-methyl-1-adamantyl (meth)acrylate, 3,5-dimethyl-1-adamantyl (meth) acrylate, 3-ethyladamantyl (meth)acrylate, 3-methyl-5-ethyl-1-adamantyl (meth)acrylate, 3,5,8-triethyl-1-adamantyl (meth)acrylate, 3,5-dimethyl-8-ethyl-1-adamantyl (meth)acrylate, 2-methyl-2-adamantyl (meth) acrylate, 2-ethyl-2-adamantyl (meth)acrylate, 3-hydroxy-1-adamantyl (meth)acrylate, octahydro-4,7-methanoinden-5-yl (meth)acrylate, octahydro-4,7-methanoinden-1-ylmethyl (meth)acrylate, 1-methyl (meth)acrylate, tricyclodecane (meth)acrylate, 3-hydroxy-2,6,6-trimethyl-bicyclo[3.1.1] heptyl (meth)acrylate, 3,7,7-trimethyl-4-hydroxy-bicyclo [4.1.0]heptyl (meth)acrylate, (nor)bornyl (meth)acrylate, isobornyl (meth)acrylate, 2,2,5-trimethylcyclohexyl (meth) acrylate, and cyclohexyl (meth)acrylate. The number of carbon atoms of the alicyclic hydrocarbon group is more preferably 6 or more. Among these, it is preferable that the ethylene unsaturated monomer containing an alicyclic hydrocarbon group having 4 or more carbon atoms is isobornyl (meth)acrylate or cyclohexyl (meth)acrylate.

Examples of the (meth)acrylate containing an aromatic hydrocarbon group having 4 or more carbon atoms include 2-naphthyl (meth)acrylate, phenoxyethyl (meth)acrylate, and benzyl (meth)acrylate. Among these, benzyl (meth) acrylate is preferable as the ethylene unsaturated monomer containing an aromatic hydrocarbon group having 4 or more carbon atoms.

The hydrophobic monomer may further contain a (meth) acrylate containing a hydrocarbon group having 1 to 3 carbon atoms.

Examples of the (meth)acrylate containing a hydrocarbon group having 1 to 3 carbon atoms include methyl (meth) acrylate, ethyl (meth)acrylate, n-propyl (meth)acrylate, and hydroxyethyl (meth)acrylate.

Among these, from the viewpoint of improving the dispersion stability of the color pigment, a structural unit derived from a (meth)acrylate containing an aromatic hydrocarbon group having 4 or more carbon atoms is preferable as the structural unit contained in the pigment dispersing resin and derived from a hydrophobic monomer.

Examples of the anionic group in the anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group.

Examples of the carboxy group-containing monomer include (meth)acrylic acid, β-carboxyethyl acrylate, fumaric acid, itaconic acid, maleic acid, and crotonic acid.

From the viewpoint of the dispersion stability, (meth) acrylic acid or β-carboxyethyl acrylate is preferable, and (meth)acrylic acid is more preferable as the anionic group-containing monomer.

The ratio between the content of the color pigment and the content of the pigment dispersing resin is preferably in a range of 1:0.04 to 1:3, more preferably in a range of 1:0.05 to 1:1, and still more preferably in a range of 1:0.05 to 1:0.5 in terms of the mass.

The content of the pigment dispersing resin is preferably in a range of 0.1% by mass to 10% by mass, more preferably in a range of 0.3% by mass to 8% by mass, and still more preferably in a range of 1% by mass to 5% by mass with respect to the total amount of the colored ink.

(Organic Solvent)

It is preferable that the colored ink in the ink set of the present disclosure contains an organic solvent. The colored ink may contain only one or two or more kinds of organic solvents.

Examples of the organic solvent include the same organic solvents as the organic solvents contained in the pretreatment liquid.

Among the examples, from the viewpoint of the jetting stability, it is preferable that the organic solvent includes at least one kind selected from the group consisting of alkylene glycol and alkylene glycol monoalkyl ether.

The content of the organic solvent is preferably in a range of 10% by mass to 40% by mass and more preferably in a range of 15% by mass to 30% by mass with respect to the total amount of the colored ink.

(Additive)

The colored ink may contain additives such as a surfactant, a water-soluble resin, a co-sensitizer, an ultraviolet absorbing agent, an antioxidant, a fading inhibitor, a conductive salt, and a basic compound as necessary.

(Physical Properties)

From the viewpoint of improving the jetting stability, the pH (25° C.) of the colored ink is preferably in a range of 7 to 10 and more preferably in a range of 7.5 to 9.5. The pH of the colored ink can be measured by the same method as that for the pH of the pretreatment liquid.

The viscosity (25° C.) of the colored ink is preferably in a range of 0.5 mPa·s to 30 mPa·s, more preferably in a range of 2 mPa·s to 20 mPa·s, still more preferably in a range of 2 mPa·s to 15 mPa·s, and particularly preferably in a range of 3 mPa·s to 10 mPa·s. The viscosity of the colored ink can be measured by the same method as that for the viscosity of the pretreatment liquid.

The surface tension (25° C.) of the colored ink is preferably 60 mN/m or less, more preferably in a range of 20 mN/m to 50 mN/m, and still more preferably in a range of 30 mN/m to 45 mN/m. The surface tension can be measured by the same method as that for the pretreatment liquid.

It is preferable that the ink set of the present disclosure further includes a white ink containing water and a white pigment. That is, it is preferable that the ink set of the present disclosure includes the above-described pretreatment liquid, the above-described colored ink, and a white ink. Hereinafter, the ink set including the pretreatment liquid, the colored ink, and the white ink will also be referred to as "second ink set".

<White Ink>

The white ink in the ink set of the present disclosure contains at least water and a white pigment, and may further contain other components as necessary.

Hereinafter, each component contained in the white ink will be described.

(White Pigment)

The white ink included in the ink set of the present disclosure contains a white pigment. The white ink may contain only one or two or more kinds of white pigments.

Examples of the white pigment include inorganic pigments such as titanium dioxide, barium sulfate, calcium carbonate, silica, zinc oxide, zinc sulfide, mica, talc, and pearl.

Among these, the white pigment is preferably titanium dioxide, barium sulfate, calcium carbonate, or zinc oxide and more preferably titanium dioxide.

From the viewpoint of the covering property, the average primary particle diameter of the white pigment is preferably 150 nm or greater and more preferably 200 nm or greater. Further, from the viewpoint of the jettability of the ink, the average primary particle diameter of the white pigment is preferably 400 nm or less and more preferably 350 nm or less.

In the present disclosure, the average primary particle diameter of the white pigment is a value measured using a transmission electron microscope (TEM). Specifically, the average primary particle diameter of the white pigment is a value determined by selecting 50 optional particles of the white pigment present in a visual field observed by a TEM, measuring the primary particle diameters of 50 particles, and averaging the measured diameters. As the transmission electron microscope, a transmission electron microscope 1200EX (manufactured by JEOL Ltd.) can be used.

From the viewpoints of the image density and the jettability, the content of the white pigment is preferably in a range of 5% by mass to 25% by mass and more preferably in a range of 10% by mass to 20% by mass with respect to the total amount of the white ink.

(Water)

The white ink in the ink set of the present disclosure contains water. The content of water is not particularly limited and is, for example, in a range of 40% by mass to 70% by mass.

(Resin)

It is preferable that the white ink included in the ink set of the present disclosure contains a resin. The white ink may contain only one or two or more kinds of resins.

The kind of the resin is not particularly limited, and examples thereof include an acrylic resin, an epoxy resin, a urethane resin, polyether, polyamide, a phenol resin, a silicone resin, a fluororesin, a vinyl resin (such as a vinyl chloride resin, a vinyl acetate-based resin, a vinyl alcohol-based resin, or a vinyl butyral-based resin), an alkyd resin, a polyester resin, a melamine resin, a melamine formaldehyde resin, an aminoalkyd cocondensation resin, and a urea resin.

Among these, from the viewpoint of improving the boiling resistance, a urethane resin is preferable as the resin. That is, it is preferable that the white ink contains a urethane resin. Hereinafter, the urethane resin that can be contained in the white ink will also be referred to as "urethane resin W".

The urethane resin W has a glass transition temperature of preferably 50° C. or lower and more preferably 0° C. or lower. In a case where the glass transition temperature thereof is 50° C. or lower, the internal stress generated by the boiling treatment is small, and thus the boiling resistance is excellent. The lower limit of the glass transition temperature of the urethane resin W contained in the colored ink is not particularly limited and is, for example, −70° C. The glass transition temperature of the urethane resin W can be measured by the same method as that for the glass transition temperature of the urethane resin P.

An absolute value of a difference between the glass transition temperature of the urethane resin C and the glass transition temperature of the urethane resin W is preferably 50° C. or lower and more preferably 30° C. or lower. The lower limit of the absolute value of the difference is not particularly limited and is, for example, 0° C.

In a case where the absolute value of the difference is 50° C. or lower, the internal stress is unlikely to be generated at an interface between the colored ink layer formed by the application of the colored ink and the white ink layer formed by the application of the white ink, and thus the boiling resistance is excellent.

A polyester-based urethane resin having an ester bond in the main chain, a polycarbonate-based urethane resin having a carbonate bond in the main chain, or a polyether-based urethane resin having an ether bond in the main chain is preferable as the urethane resin W.

The urethane resin W may be a water-soluble urethane resin that is dissolved in water or in the form of urethane resin particles that are present by being dispersed in water. Among these, from the viewpoint of increasing the strength of the white ink layer formed by the application of the white ink, it is preferable that the urethane resin W is in the form of urethane resin particles.

In a case where the urethane resin W is in the form of urethane resin particles, from the viewpoint of jetting stability, the urethane resin W has an average particle diameter of preferably 1 nm to 200 nm, more preferably 3 nm to 200 nm, and still more preferably 5 nm to 50 nm. The average particle diameter of the urethane resin W can be measured by the same method as that for the average particle diameter of the urethane resin P.

The urethane resin W may be any of anionic, cationic, or nonionic. From the viewpoint of improving the storage stability of the white ink, it is preferable that the urethane resin W is an anionic urethane resin.

The weight-average molecular weight (Mw) of the urethane resin W is not particularly limited, but is preferably in a range of 1,000 to 300,000, more preferably in a range of 2,000 to 200,000, and still more preferably in a range of 10,000 to 150,000. The Mw of the urethane resin W can be measured by the same method as that for the Mw of the urethane resin P.

A commercially available product may be used as the urethane resin W. Examples of the commercially available product include SUPERFLEX Series (manufactured by DKS Co., Ltd.), PERMARIN UA Series and UCOAT Series (manufactured by Sanyo Chemical Industries, Ltd.), TAKELAC Series (manufactured by Mitsui Chemicals, Inc.), and PUE Series (manufactured by Murayama Chemical Laboratory Co., Ltd.).

The content of the urethane resin W is preferably in a range of 1% by mass to 20% by mass and more preferably in a range of 3% by mass to 8% by mass with respect to the total amount of the white ink.

In a case where the white pigment contained in the white ink is not a self-dispersing pigment that can be dispersed in water, it is preferable that the white ink further contains a pigment dispersing resin. In a case where the white pigment is a self-dispersing pigment, the white pigment may contain no pigment dispersing resin.

A pigment dispersing resin is typically contained in a pigment dispersion liquid by being mixed with a white pigment in advance. The dispersing resin may be appropriately selected from known dispersing agents of the related art, and may be a random copolymer or a block copolymer. Further, the pigment dispersing resin may have a crosslinking structure.

Among the examples, it is preferable that the pigment dispersing resin contained in the white ink is a random copolymer. Specific examples of the pigment dispersing resin contained in the white ink are the same as the specific examples of the pigment dispersing resin contained in the colored ink.

From the viewpoint of improving the dispersion stability of the white pigment, it is preferable that the structural unit contained in the pigment dispersing resin of the white ink and derived from a hydrophobic monomer includes a structural unit derived from a (meth)acrylate containing a chain-like hydrocarbon group having 4 or more carbon atoms and a structural unit derived from a (meth)acrylate containing an aromatic hydrocarbon group having 4 or more carbon atoms.

The ratio between the content of the white pigment and the content of the pigment dispersing resin is preferably in a range of 1:0.04 to 1:3, more preferably in a range of 1:0.05 to 1:1, and still more preferably in a range of 1:0.05 to 1:0.5 in terms of the mass.

(Organic Solvent)

It is preferable that the white ink in the ink set of the present disclosure contains an organic solvent. The white ink may contain only one or two or more kinds of organic solvents. The preferable aspects of the organic solvent contained in the white ink are the same as the preferable aspects of the organic solvent contained in the colored ink.

(Additive)

The white ink may contain additives such as a surfactant, a water-soluble resin, a co-sensitizer, an ultraviolet absorbing agent, an antioxidant, a fading inhibitor, a conductive salt, and a basic compound as necessary.

(Physical Properties)

The preferable aspects of the pH, the surface tension, and the viscosity of the white ink are the same as the preferable aspects of the pH, the surface tension, and the viscosity of the colored ink.

[Image Recording Method]

—First Aspect—

It is preferable that an image recording method according to a first aspect of the present disclosure, using the first ink set, includes a step of applying the pretreatment liquid onto an impermeable base material (hereinafter, also referred to as "pretreatment liquid applying step") and a step of applying the colored ink onto the impermeable base material onto which the pretreatment liquid has been applied by an ink jet recording method (hereinafter, also referred to as "colored ink applying step").

<Pretreatment Liquid Applying Step>

The pretreatment liquid applying step is a step of applying the pretreatment liquid onto the impermeable base material.

(Impermeable Base Material)

In the present disclosure, the impermeability in the impermeable base material denotes a property that the water absorption rate in 24 hours which is measured in conformity with ASTM D570-98 (2018) is 2.5% or less. Here, the unit "%" of the water absorption rate is on a mass basis. The water absorption rate is preferably 1.0% or less and more preferably 0.5% or less.

Examples of the material of the impermeable base material include glass, a metal (such as aluminum, zinc, or copper), and a resin (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is preferable that the material of the impermeable base material is a resin. That is, it is preferable that the impermeable base material is a resin base material.

Examples of the material of the impermeable base material are as described above, but polypropylene, polyethylene, polyethylene terephthalate, nylon, an acrylic resin, or polyvinyl chloride is preferable from the viewpoint of versatility.

As the shape of the impermeable base material, a sheet-like (film-like) or a plate-like impermeable base material is preferable. Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

Further, the thickness of the impermeable base material is preferably in a range of 0.1 m to 1,000 m, more preferably in a range of 0.1 m to 800 m, and still more preferably in a range of 1 m to 500 km.

The impermeable base material may be subjected to a hydrophilization treatment. Examples of the hydrophilization treatment include a corona treatment, a plasma treatment, a heat treatment, an abrasion treatment, a light irradiation treatment (such as a UV treatment), and a flame treatment, but the hydrophilization treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

(Application of Pretreatment Liquid)

A method of applying the pretreatment liquid is not particularly limited, and examples thereof include known methods such as a coating method, a dipping method, and an ink jet recording method.

Examples of the coating method include known coating methods using a bar coater, an extrusion die coater, an air doctor coater, a blade coater, a rod coater, a knife coater, a squeeze coater, and a reverse roll coater.

After the application of the pretreatment liquid, the pretreatment liquid applied onto the impermeable base material may be heated and dried. Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

<Colored Ink Applying Step>

The colored ink applying step is a step of applying the colored ink onto the impermeable base material onto which the pretreatment liquid has been applied, using an ink jet recording method.

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the ink onto the impermeable base material using the ink jet recording method can be performed by allowing the ink to be jetted from a nozzle of an ink jet head.

Examples of the system of the ink jet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the colored ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the ink droplet amount of the colored ink is preferably in a range of 1 picoliter (pL) to 10 pL and more preferably in a range of 1.5 pL to 6 pL.

—Second Aspect—

It is preferable that an image recording method according to a second aspect of the present disclosure, using the second ink set, includes a step of applying the pretreatment liquid onto an impermeable base material and a step of applying the colored ink and the white ink onto the impermeable base material onto which the pretreatment liquid has been applied by an ink jet recording method.

The step of applying the pretreatment liquid onto the impermeable base material is the same as the pretreatment liquid applying step in the first aspect of the image recording method.

The order of applying the colored ink and the white ink onto the impermeable base material onto which the pretreatment liquid has been applied is not particularly limited, but it is preferable that the white ink is applied after the colored ink is applied. For example, a multicolor image in which a color pattern image (a character, a figure, or the like) recorded with the colored ink and a white image in the form of a solid image recorded with the white ink to cover the pattern image are disposed on the impermeable base material in this order can be recorded. In this case, the pattern image can be visually recognized through the impermeable base material from a rear surface side (that is, a side of the impermeable base material where the image is not recorded) of the impermeable base material.

The method of applying the colored ink and the white ink by an ink jet recording method in the second aspect is the same as the method of applying the colored ink by an ink jet recording method in the first aspect.

[Method of Producing Laminate]

It is preferable that a method of producing a laminate the present disclosure includes a step of obtaining an image recorded material that includes the impermeable base material and an image disposed on the impermeable base material by the image recording method of the present disclosure, and a step of laminating a base material for lamination on a side of the image recorded material where the image has been disposed, to obtain a laminate.

According to the image recording method of the present disclosure, an image recorded material including an impermeable base material and an image recorded on the impermeable base material and having excellent boiling resistance in a case where a base material for lamination is laminated on the image can be produced.

Therefore, the image recording method of the present disclosure is suitably used for producing a laminate including the above-described image recorded material and a base material for lamination which is laminated on a side of the image recorded material where the image is recorded.

According to the method of producing a laminate of the present disclosure, a laminate with excellent boiling resistance can be produced.

The step of obtaining an image recorded material can refer to the image recording method of the present disclosure.

The step of obtaining a laminate is a step of laminating the base material for lamination on a side of the image recorded material where the image has been disposed, to obtain a laminate. The lamination can be performed by a method of superimposing the base material for lamination on the side of the image recorded material where the image has been disposed via another layer (for example, an adhesive layer) and attaching the base material thereto, a method of attaching the base material for lamination to the side of the image recorded material where the image has been disposed via a laminator in a state where the base material is superimposed on the side thereof, or the like. In the latter case, a commercially available laminator can be used.

The lamination temperature in a case of carrying out the lamination is not particularly limited. For example, in a case where the image recorded material and the base material for lamination are attached to each other via another layer (for example, an adhesive layer), the temperature may be 20° C. or higher. Further, in a case where a laminator is used, the temperature of a laminating roll may be set to be in a range of 20° C. to 80° C. The pressure-bonding force between a pair of laminating rolls may be appropriately selected as necessary.

It is preferable that the base material for lamination is a resin base material. The resin base material is not particularly limited, and examples thereof include a base material consisting of a thermoplastic resin.

Examples of the resin base material include a base material obtained by molding a thermoplastic resin in a sheet shape.

It is preferable that the resin base material contains polypropylene, polyethylene terephthalate, nylon, polyethylene, or polyimide.

The shape of the resin base material is not particularly limited, but it is preferable that the resin base material has a sheet shape. The thickness of the resin base material is preferably in a range of 10 m to 200 m and more preferably in a range of 10 m to 100 m.

In the step of obtaining a laminate, the base material for lamination may be laminated directly on a side of the image recorded material where the image has been disposed or via another layer (for example, an adhesive layer).

In a case where the base material for lamination is laminated directly on a side of the image recorded material where the image has been disposed, the lamination can be performed by a known method such as thermocompression bonding or thermal fusion welding.

Further, in a case where the base material for lamination is laminated on a side of the image recorded material where the image has been disposed via an adhesive layer, the lamination can be performed by, for example, a method of coating the side of the image recorded material where the image has been disposed with an adhesive, placing the base material for lamination, and bonding the image recorded material to the base material for lamination.

Further, in the case where the base material for lamination is laminated on a side of the image recorded material where the image has been disposed via an adhesive layer, the lamination can also be performed by an extrusion lamination method (that is, sandwich lamination) or the like.

It is preferable that the adhesive layer contains an isocyanate compound. In a case where the adhesive layer contains an isocyanate compound, since the adhesiveness between the adhesive layer and the image is further improved, the boiling resistance can be further improved.

[Image Recorded Material]

An image recorded material of the present disclosure includes an impermeable base material and an image disposed on the impermeable base material, in which the image includes a pretreatment layer disposed on the impermeable base material and containing a urethane resin having a glass transition temperature of −55° C. to 50° C., and a colored ink layer disposed on the pretreatment layer and containing a pigment other than a white pigment and a urethane resin.

Further, in the image recorded material of the present disclosure, the image may further include a white ink layer disposed on the colored ink layer and containing a white pigment.

The laminate obtained by laminating the base material for lamination on the image recorded material of the present disclosure has excellent boiling resistance.

The pretreatment layer may be disposed to cover the entire surface or a part of the impermeable base material. Further, the colored ink layer may be disposed to cover the entire surface or a part of the pretreatment layer. Further, the white ink layer may be disposed to cover the entire surface or a part of the colored ink layer.

The preferable aspects of each component in the image recorded material are the same as the preferable aspects of each component described in the section of the ink set of the present disclosure.

[Laminate]

The laminate of the present disclosure includes the above-described image recorded material of the present disclosure and a base material for lamination which is laminated on the image of the above-described image recorded material.

The laminate of the present disclosure has excellent boiling resistance.

The base material for lamination in the laminate may be laminated directly on a side of the image recorded material where the image has been disposed or may be laminated via another layer (for example, an adhesive layer).

It is preferable that the laminate of the present disclosure is produced by the method of producing the laminate of the present disclosure.

The preferred embodiments of the base material for lamination and the adhesive layer are respectively the same as the preferred embodiments described in the section of the method of producing a laminate.

EXAMPLES

Hereinafter, the present disclosure will be described in more detail based on examples, but the present disclosure is not limited to the following examples unless the gist thereof is overstepped.

Examples 1 to 15 and Comparative Examples 1 to 6

<Preparation of Pretreatment Liquid>

The following components were mixed to have the following contents, thereby preparing a pretreatment liquid.

- Isopropanol: 5% by mass
- Resin listed in Table 1: 10% by mass (content of resin in terms of solid content)
- Surfactant (product name, "OLFINE E1010", manufactured by Nissin Chemical Co., Ltd.): 0.5% by mass
- Water: 84.5% by mass <Preparation of Colored Ink>

In preparation of a cyan ink which is a colored ink, first, a pigment dispersing resin C was synthesized.

—Synthesis of Pigment Dispersing Resin C—

88 g of methyl ethyl ketone was added to a 1,000 mL three-neck flask provided with a stirrer and a cooling pipe and heated at 72° C. in a nitrogen atmosphere, and a solution obtained by dissolving 0.85 g of dimethyl 2,2'-azobisisobutyrate, 71.6 g of benzyl methacrylate, 18.4 g of methacrylic acid, and 10.0 g of methyl methacrylate in 50 g of methyl ethyl ketone was added dropwise thereto for 3 hours. After completion of the dropwise addition, the solution was allowed to further react for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was reprecipitated twice in a largely excessive amount of hexane, and the deposited resin was dried, thereby obtaining a pigment dispersing resin C.

The structural unit of the obtained pigment dispersing resin C was confirmed by $^{1}$H-NMR. Further, the weight-average molecular weight (Mw) determined by GPC in terms of polystyrene was 44600.

Further, the mass ratio of respective structural units in the pigment dispersing resin C (structural unit derived from benzyl methacrylate/structural unit derived from methyl methacrylate/structural unit derived from methacrylic acid) was 71.6/10/18.4.

The acid value of the pigment dispersing resin C was 120 mgKOH/g.

—Preparation of Pigment Dispersion Liquid C—

C.I. Pigment Blue 15:3 (manufactured by Dainichiseika Color & Chemicals Mfg. Co., Ltd.) (4 parts by mass) which is a cyan pigment, the pigment dispersing resin C (2 parts by mass), methyl ethyl ketone (42 parts by mass), a 1 mol/L NaOH aqueous solution (5.5 parts by mass), and water (87.2 parts by mass) were mixed. The mixture was dispersed by a beads mill using 0.1 mmφ zirconia beads at a rotation speed of 2,500 rpm for 6 hours. The obtained dispersion liquid was concentrated under reduced pressure at 55° C. until methyl ethyl ketone was sufficiently distilled off, and a part of water was further removed. Thereafter, a centrifugation treatment (using a 50 mL centrifugal tube) was performed at a rotation speed of 8,000 rpm for 30 minutes using a high-speed centrifugal cooler 7550 (manufactured by Kubota Corporation) to remove the precipitate, and the supernatant solution was recovered.

As described above, a pigment dispersion liquid C containing a cyan pigment partially coated with the pigment dispersing resin C was obtained.

—Preparation of Colored Ink (Cyan Ink)—

The following contents of the components were mixed using the prepared pigment dispersion liquid C, to prepare a cyan ink.

- Cyan pigment: 5% by mass
- Pigment dispersing resin C: 2.5% by mass
- 1,2-Propanediol: 20% by mass
- Propylene glycol monomethyl ether: 5% by mass
- Surfactant (product name, "OLFINE E1010", manufactured by Nissin Chemical Co., Ltd.): 0.5% by mass
- Surfactant (product name, "BYK-349", manufactured by BYK-Chemie GmbH): 0.5% by mass
- Water-soluble resin: polyvinylpyrrolidone (product name, "PVP K-15", manufactured by Ashland Inc.): 0.1% by mass
- Resin listed in Table 1: 6% by mass
- Water: 60.4% by mass The details of the resins listed in Table 1 are as follows. Further, the resin emulsion denotes a dispersion liquid containing a resin, and the resin is present in the form of resin particles in a liquid.

- SUPERFLEX 420: urethane resin emulsion, manufactured by DKS Co., Ltd.
- SUPERFLEX 150: urethane resin emulsion, manufactured by DKS Co., Ltd.
- SUPERFLEX 500M: urethane resin emulsion, manufactured by DKS Co., Ltd.
- SUPERFLEX E-2000: urethane resin emulsion, manufactured by DKS Co., Ltd.
- SUPERFLEX E-4800: urethane resin emulsion, manufactured by DKS Co., Ltd.
- SUPERFLEX 830HS: urethane resin emulsion, manufactured by DKS Co., Ltd.
- SUPERFLEX 820: urethane resin emulsion, manufactured by DKS Co., Ltd.
- SUPERFLEX 460: urethane resin emulsion, manufactured by DKS Co., Ltd.
- PERMARIN UA-368: urethane resin emulsion, manufactured by Sanyo Chemical Industries, Ltd.
- PUE-1370: urethane resin emulsion, manufactured by Murayama Chemical Laboratory Co., Ltd.
- TAKELAC W-5661: urethane resin emulsion, manufactured by Mitsui Chemicals, Inc.
- TAKELAC W-6110: urethane resin emulsion, manufactured by Mitsui Chemicals, Inc.
- UCOAT UWS-145: urethane resin emulsion, manufactured by Sanyo Chemical Industries, Ltd.
- MOVINYL 6770: acrylic resin emulsion, manufactured by Japan Coating Resin Co., Ltd.
- JONCRYL 537: acrylic resin emulsion, manufactured by BASF SE
- ACRIT WBR-016U: urethane resin emulsion, manufactured by TAISEI FINE CHEMICAL CO., LTD.

<Image Recording>

Image recording was performed using the pretreatment liquid and the cyan ink.

An ink jet recording device including a transport system for continuously transporting a long base material, a wire bar coater for coating the base material with the pretreatment liquid, and an ink jet head for applying the cyan ink was prepared.

Further, a polyethylene terephthalate (PET) base material ("FE2001", manufactured by Futamura Chemical Co., Ltd., (thickness of 12 m, width of 780 mm, length of 4,000 m)), hereinafter, referred to as "impermeable base material A") serving as an impermeable base material was prepared as the base material.

The impermeable base material A was coated with the pretreatment liquid using a wire bar coater such that the amount of the pretreatment liquid to be applied reached approximately 1.7 g/m$^2$, and the pretreatment liquid was dried at 50° C. for 2 seconds.

The cyan ink was jetted from the ink jet head and applied in the form of a solid image to the surface of the impermeable base material A, which had been coated with the pretreatment liquid, while the impermeable base material A was continuously transported at 50 m/min using the ink jet recording device. A solid image was recorded by drying the applied cyan ink with warm air at 80° C. for 30 seconds, thereby obtaining an image recorded material.

—Ink Application Conditions—

- Ink jet head: 1,200 dpi/30 inch-width piezo full line head
- Amount of ink jetted from ink jet head: 3.0 picoliters (pL)

Driving frequency: 41 kHz (transportation speed of base material: 50 m/min)

[Evaluation]

The boiling resistance of the image recorded material and the storage stability of the cyan ink were evaluated for each example and each comparative example. The evaluation method is as follows. The evaluation results are listed in Table 1.

(Boiling Resistance)

The solid image of the image recorded material was coated with an adhesive for dry lamination (main agent TM-320 (isocyanate compound)/curing agent CAT-13B (alcohol compound), manufactured by TOYO Morton) using a dry laminating machine (product name, "FL2", manufactured by FUJI KIKAI KOGYO Co., Ltd.), and a linear low-density polyethylene film (trade name, "LL-XMTN", manufactured by FUTAMURA CHEMICAL CO., LTD., thickness of 40 m) was laminated thereon as a base material for lamination. The base material for lamination and the image recorded material were bonded to each other in this state, thereby obtaining a laminate.

The obtained laminate was aged at 40° C. for 48 hours.

Two sheets of sample pieces having a length of 200 mm and a width of 200 mm were cut out from the aged laminate. The cut-out sample pieces were overlapped with each other and three sides thereof were heat-sealed to form a bag. The bag was filled with pure water and sealed by heat sealing.

The bag was placed in an autoclave for retort food (small sterilizer) (product name, "SR-240", manufactured by Tomy Seiko Co., Ltd.) and subjected to a boiling treatment at 95° C. for 40 minutes. The bag was taken out after the boiling treatment, and the state of the bag was visually observed. Specifically, the boiling resistance was evaluated based on the presence or absence of deformation and laminate floating of the bag. The evaluation standards are as follows. The laminate floating is a state in which the image or the base material for lamination is peeled off and thus floating occurs.

5: Deformation and laminate floating were not observed.

4: Laminate floating was not found, but deformation was confirmed.

3: Laminate floating was confirmed at one site.

2: Laminate floating was confirmed at a plurality of sites.

1: Laminate floating was confirmed on the entire surface of the sample piece.

(Storage Stability)

The viscosity of the cyan ink that was allowed to stand at 25° C. for 1 hour after the preparation (hereinafter, referred to as "viscosity before storage") and the viscosity of the cyan ink that was stored in a sealed state at 60° C. for 14 days after the preparation (hereinafter, referred to as "viscosity after storage") were respectively measured. Both the viscosity before storage and the viscosity after storage were measured under conditions of 30° C. at 100 rpm (revolutions per minute) using VISCOMETER TV-22 (manufactured by TOKI SANGYO CO. LTD). Here, the sealed state indicates a state in which the contents are sealed in a container and the amount of decrease in the mass of the contents is less than 1% by mass in a case where the contents are stored under the conditions of 50° C. for 14 days.

A value obtained by subtracting the viscosity before storage from the viscosity after storage was calculated as a degree of an increase in viscosity. As the degree of an increase in viscosity decreases, the storage stability is excellent. The evaluation standards are as follows.

5: The degree of an increase in viscosity was less than 0.3 mPa·s.

4: The degree of an increase in viscosity was 0.3 mPa·s or greater and less than 0.5 mPa·s.

3: The degree of an increase in viscosity was 0.5 mPa·s or greater and less than 1.0 mPa·s.

2: The degree of an increase in viscosity was 1.0 mPa·s or greater and less than 2.0 mPa·s.

1: The degree of an increase in viscosity was 2.0 mPa·s or greater.

In Table 1, the glass transition temperature of the resin contained in the pretreatment liquid is defined as Tg (P), and the glass transition temperature of the resin contained in the colored ink (cyan ink) is defined as Tg (C). "|Tg (P)−Tg (C)|" denotes the absolute value of the difference between the glass transition temperature of the resin contained in the pretreatment liquid and the glass transition temperature of the resin contained in the colored ink. The glass transition temperature is in units of "° C.". The breaking elongation is in units of "%". In the columns of ionicity, the anion denotes anionic, and the nonion denotes nonionic.

TABLE 1

| | Pretreatment liquid Resin | | | | Colored ink Resin | | | | | Evaluation | |
|---|---|---|---|---|---|---|---|---|---|---|---|
| | Type | Name | Tg (P) | Breaking elongation | Type | Ionicity | Name | Tg (C) | \|Tg (P) − Tg (C)\| | Boiling resistance | Storage stability |
| Example 1 | Urethane | SUPERFLEX 420 | −10 | 290 | Urethane | Anion | UCOAT UWS-145 | −58 | 48 | 4 | 5 |
| Example 2 | Urethane | SUPERFLEX 150 | 40 | 330 | Urethane | Anion | UCOAT UWS-145 | −58 | 98 | 4 | 5 |
| Example 3 | Urethane | PERMARIN UA-368 | −31 | 500 | Urethane | Anion | UCOAT UWS-145 | −58 | 27 | 5 | 5 |
| Example 4 | Urethane | SUPERFLEX 500M | −39 | 1100 | Urethane | Anion | UCOAT UWS-145 | −58 | 19 | 5 | 5 |
| Example 5 | Urethane | SUPERFLEX E-2000 | −38 | 1350 | Urethane | Anion | UCOAT UWS-145 | −58 | 20 | 4 | 5 |
| Example 6 | Urethane | SUPERFLEX 150 | 40 | 330 | Urethane | Anion | SUPERFLEX 830HS | 68 | 28 | 4 | 5 |
| Example 7 | Urethane | SUPERFLEX 150 | 40 | 330 | Urethane | Anion | SUPERFLEX 820 | 46 | 6 | 5 | 5 |
| Example 8 | Urethane | SUPERFLEX 150 | 40 | 330 | Urethane | Anion | SUPERFLEX 460 | −21 | 61 | 4 | 5 |
| Example 9 | Urethane | SUPERFLEX 150 | 40 | 330 | Urethane | Anion | TAKELAC W-6110 | −40 | 80 | 4 | 5 |
| Example 10 | Urethane | SUPERFLEX 500M | −39 | 1100 | Urethane | Anion | SUPERFLEX 830HS | 68 | 107 | 3 | 5 |

TABLE 1-continued

| | Pretreatment liquid Resin | | | | Colored ink Resin | | | | | Evaluation | |
|---|---|---|---|---|---|---|---|---|---|---|---|
| | Type | Name | Tg (P) | Breaking elongation | Type | Ionicity | Name | Tg (C) | \|Tg (P) − Tg (C)\| | Boiling resistance | Storage stability |
| Example 11 | Urethane | SUPERFLEX 500M | −39 | 1100 | Urethane | Anion | ACRIT WBR-016U | 20 | 59 | 4 | 5 |
| Example 12 | Urethane | SUPERFLEX 500M | −39 | 1100 | Urethane | Anion | SUPERFLEX 420 | −10 | 29 | 5 | 5 |
| Example 13 | Urethane | SUPERFLEX 500M | −39 | 1100 | Urethane | Anion | TAKELAC W-6110 | −40 | 1 | 5 | 5 |
| Example 14 | Urethane | SUPERFLEX 500M | −39 | 1100 | Urethane | Nonion | SUPERFLEX 500M | −39 | 0 | 5 | 3 |
| Example 15 | Urethane | SUPERFLEX 500M | −39 | 1100 | Urethane | Nonion | PUE-1370 | −59 | 20 | 5 | 3 |
| Comparative Example 1 | Urethane | SUPERFLEX E-4800 | −65 | 720 | Urethane | Anion | UCOAT UWS-145 | −58 | 7 | 1 | 5 |
| Comparative Example 2 | Urethane | PUE-1370 | −59 | 1200 | Urethane | Anion | TAKELAC W-6110 | −40 | 19 | 1 | 5 |
| Comparative Example 3 | Urethane | SUPERFLEX 830HS | 68 | 5 | Urethane | Anion | UCOAT UWS-145 | −58 | 126 | 1 | 5 |
| Comparative Example 4 | Acryl | MOVINYL 6770 | −6 | 15 | Urethane | Anion | UCOAT UWS-145 | −58 | 52 | 1 | 5 |
| Comparative Example 5 | Acryl | JONCRYL 537 | 44 | 4 | Urethane | Anion | UCOAT UWS-145 | −58 | 102 | 1 | 5 |
| Comparative Example 6 | Urethane | TAKELAC W-5661 | 35 | 600 | Acryl | Anion | MOVINYL 6770 | −6 | 41 | 1 | 5 |

As listed in Table 1, in Examples 1 to 15, it was found that since the pretreatment liquid contained water and a urethane resin having a glass transition temperature of −55° C. to 50° C. and the colored ink contained water, a pigment other than a white pigment, and a urethane resin, the boiling resistance was excellent.

On the contrary, in Comparative Examples 1 and 2, it was found that the glass transition temperature of the urethane resin contained in the pretreatment liquid was lower than −55° C., and thus the boiling resistance was degraded.

In Comparative Example 3, it was found that the glass transition temperature of the urethane resin contained in the pretreatment liquid was higher than 50° C., and thus the boiling resistance was degraded.

In Comparative Examples 4 and 5, it was found that the pretreatment liquid did not contain a urethane resin, and thus the boiling resistance was degraded.

In Comparative Example 6, it was found that the colored ink did not contain a urethane resin, and thus the boiling resistance was degraded.

In Examples 1 to 13, it was found that since the urethane resin contained in the colored ink was an anionic urethane resin, the storage stability of the colored ink was excellent as compared with Examples 14 and 15.

In Example 2, it was found that since the breaking elongation of the urethane resin contained in the pretreatment liquid was 300% or greater, the boiling resistance was excellent as compared with Example 1.

In Example 4, it was found that since the breaking elongation of the urethane resin contained in the pretreatment liquid was 1,300% or less, the boiling resistance was excellent as compared with Example 5.

In Example 7, it was found that since the glass transition temperature of the urethane resin contained in the colored ink was 50° C. or lower, the boiling resistance was excellent as compared with Example 6.

In Example 12, it was found that since the absolute value of the difference between the glass transition temperature of the urethane resin contained in the pretreatment liquid and the glass transition temperature of the urethane resin contained in the colored ink was 50° C. or lower, the boiling resistance was excellent as compared with Example 11.

Examples 101 to 107

<Preparation of Pretreatment Liquid>

A pretreatment liquid was prepared by the same method as in Example 1.

<Preparation of Colored Ink>

A colored ink (cyan ink) was prepared by the same method as in Example 1 except that the resin was changed to the resin listed in Table 2.

<Preparation of White Ink>

In preparation of a white ink, first, a pigment dispersing resin W was synthesized.

—Synthesis of Pigment Dispersing Resin W—

100 g of dipropylene glycol was added to a three-neck flask provided with a stirrer and a cooling pipe and heated to 85° C. in a nitrogen atmosphere.

A solution 1 obtained by mixing 14.0 g of stearyl methacrylate, 35.3 g of benzyl methacrylate, 20.0 g of hydroxyethyl methacrylate, 30.7 g of methacrylic acid, and 0.55 g of 2-mercaptopropionic acid and a solution 2 obtained by dissolving 1.0 g of t-butylperoxy-2-ethylhexanoate (product name, "Perbutyl O", manufactured by NOF Corporation) in 20 g of dipropylene glycol were respectively prepared. The solution 1 was added dropwise to the three-neck flask for 4 hours, and the solution 2 was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance ($^1$H-NMR) method.

The obtained reaction solution was heated to 70° C., 12.0 g of dimethylethanolamine was added thereto as an amine compound, propylene glycol was added thereto, and the solution was stirred, thereby obtaining a 30 mass % solution of the pigment dispersing resin W which was a polymer.

The structural unit of the obtained pigment dispersing resin W was confirmed by $^{1}$H-NMR. Further, the weight-average molecular weight (Mw) determined by GPC was 28,000.

Further, the mass ratio of respective structural units in the pigment dispersing resin W (structural unit derived from stearyl methacrylate/structural unit derived from benzyl methacrylate/structural unit derived from hydroxyethyl methacrylate/structural unit derived from methacrylic acid) was 14/35.3/20/30.7. Here, the mass ratio does not include the mass of dimethylaminoethanol.

The acid value of the pigment dispersing resin W was 200 mgKOH/g.

—Preparation of Pigment Dispersion Liquid W—

45 parts by mass of titanium dioxide particles (trade name, "PF-690", average primary particle diameter: 210 nm, manufactured by Ishihara Sangyo Kaisha, Ltd.) serving as a white pigment, 15 parts by mass of a 30 mass % solution of the pigment dispersing resin W, and 40 parts by mass of ultrapure water were added to a zirconia container zirconia. Further, 40 parts by mass of 0.5 mmφ zirconia beads (Torayceram beads, manufactured by Toray Industries, Inc.) were added thereto, and the mixture was mixed gently using a spatula. The zirconia container containing the obtained mixture was placed in a Lady mill (model LSG-4U-08 (manufactured by IMEX Co., Ltd.)), and the mixture was dispersed at a rotation speed of 1,000 rpm (revolutions per minute) for 5 hours. After completion of the dispersion, the beads were removed by filtration with a filter cloth, thereby obtaining a pigment dispersion liquid W having a white pigment concentration of 45% by mass.

—Preparation of White Ink—

The following contents of the components were mixed using the prepared pigment dispersion liquid W, thereby preparing a white ink.

White pigment: 15% by mass
Pigment dispersing resin W: 1.5% by mass
1,2-Propanediol: 15% by mass
Propylene glycol monomethyl ether: 5% by mass
Surfactant (product name, "OLFINE E1010", manufactured by Nissin Chemical Co., Ltd.): 0.5% by mass
Surfactant (product name, "BYK-349", manufactured by BYK-Chemie GmbH): 0.5% by mass
Water-soluble resin: polyvinylpyrrolidone (product name, "PVP K-15", manufactured by Ashland Inc.): 0.1% by mass
Resin described in Table 2: 4% by mass
Water: 58.4% by mass <Image Recording>

Image recording was performed using the pretreatment liquid, the cyan ink, and the white ink.

An ink jet recording device including a transport system for continuously transporting a long base material, a first ink jet head for applying the cyan ink, and a second ink jet head for applying the white ink was prepared.

Further, a polyethylene terephthalate (PET) base material ("FE2001", manufactured by Futamura Chemical Co., Ltd., (thickness of 12 m, width of 780 mm, length of 4,000 m), hereinafter, referred to as an "impermeable base material A") serving as an impermeable base material was prepared as the base material.

The impermeable base material A was coated with the pretreatment liquid using a wire bar coater such that the amount of the pretreatment liquid to be applied reached approximately 1.7 g/m$^2$, and the pretreatment liquid was dried at 50° C. for 2 seconds.

The cyan ink was jetted from the first ink jet head and applied in the form of a solid image while the impermeable base material A was continuously transported at 50 m/min using the ink jet recording device, and the white ink was jetted from the second ink jet head and applied in the form of a solid image onto the applied cyan ink. A solid image was recorded by drying the applied ink with warm air at 80° C. for 30 seconds, thereby obtaining an image recorded material.

—Ink Application Conditions—

Ink jet head: 1,200 dpi/30 inch-width piezo full line head
Amount of ink jetted from ink jet head: 3.0 picoliters (pL)
Driving frequency: 41 kHz (transportation speed of base material: 50 m/min)

[Evaluation]

The boiling resistance of the image recorded material was evaluated for each example. The evaluation method is the same as in Example 1. The evaluation results are listed in Table 2.

In Table 2, the glass transition temperature of the resin contained in the colored ink (cyan ink) is defined as Tg (C), and the glass transition temperature of the resin contained in the white ink is defined as Tg (W). "|Tg (C)−Tg (W)|" denotes the absolute value of the difference between the glass transition temperature of the resin contained in the colored ink and the glass transition temperature of the resin contained in the white ink.

TABLE 2

| | Pretreatment liquid Resin | | | | Colored ink Resin | | | |
|---|---|---|---|---|---|---|---|---|
| | Type | Name | Tg (P) | Breaking elongation | Type | Ionicity | Name | Tg (C) |
| Example 101 | Urethane | SUPERFLEX 500M | −39 | 1100 | Urethane | Anion | UCOAT UWS-145 | −58 |
| Example 102 | Urethane | SUPERFLEX 500M | −39 | 1100 | Urethane | Anion | UCOAT UWS-145 | −58 |
| Example 103 | Urethane | SUPERFLEX 500M | −39 | 1100 | Urethane | Anion | UCOAT UWS-145 | −58 |
| Example 104 | Urethane | SUPERFLEX 500M | −39 | 1100 | Urethane | Anion | UCOAT UWS-145 | −58 |
| Example 105 | Urethane | SUPERFLEX 500M | −39 | 1100 | Urethane | Anion | UCOAT UWS-145 | −58 |
| Example 106 | Urethane | SUPERFLEX 500M | −39 | 1100 | Urethane | Anion | UCOAT UWS-145 | −58 |

TABLE 2-continued

| | | | | | | | | |
|---|---|---|---|---|---|---|---|---|
| Example 107 | Urethane | SUPERFLEX 500M | −39 | 1100 | Urethane | Anion | UCOAT UWS-145 | −58 |
| Example 108 | Urethane | SUPERFLEX 500M | −39 | 1100 | Urethane | Anion | SUPERFLEX 420 | −10 |
| Example 109 | Urethane | SUPERFLEX 500M | −39 | 1100 | Urethane | Anion | SUPERFLEX 420 | −10 |

| | White ink Resin | | | | \|Tg (C) − | Evaluation |
|---|---|---|---|---|---|---|
| | Type | Ionicity | Name | Tg (W) | Tg (W)\| | Boiling resistance |
| Example 101 | Urethane | Anion | UCOAT UWS-145 | −58 | 0 | 5 |
| Example 102 | Urethane | Anion | SUPERFLEX 830HS | 68 | 126 | 3 |
| Example 103 | Urethane | Anion | ACRIT WBR-016U | 20 | 78 | 4 |
| Example 104 | Urethane | Anion | SUPERFLEX 420 | −10 | 48 | 5 |
| Example 105 | Urethane | Anion | TAKELAC W-6110 | −40 | 18 | 5 |
| Example 106 | Acryl | Anion | JONCRYL 537 | 44 | 102 | 3 |
| Example 107 | Acryl | Anion | MOVINYL 6770 | −6 | 52 | 3 |
| Example 108 | Urethane | Anion | UCOAT UWS-145 | −58 | 48 | 5 |
| Example 109 | Urethane | Anion | SUPERFLEX 820 | 46 | 56 | 4 |

As listed in Table 2, in Examples 101 to 107, it was found that since the pretreatment liquid contained water and a urethane resin having a glass transition temperature of −55° C. to 50° C. and the colored ink contained water, a pigment other than a white pigment, and a urethane resin, the boiling resistance was excellent.

In Examples 101 to 105, it was found that since the white ink contained a urethane resin, the boiling resistance was excellent as compared with Examples 106 and 107.

In Example 103, it was found that since the glass transition temperature of the urethane resin contained in the white ink was 50° C. or lower, the boiling resistance was excellent as compared with Example 102.

In Example 108, it was found that since the absolute value of the difference between the glass transition temperature of the urethane resin contained in the colored ink and the glass transition temperature of the urethane resin contained in the white ink was 50° C. or lower, the boiling resistance was excellent as compared with Example 109.

Examples 201 and 202

<Preparation of Pretreatment Liquid>

The following contents of the components were mixed to prepare a pretreatment liquid containing an aggregating agent.

- Aggregating agent: glutaric acid: 4% by mass
- Isopropanol: 5% by mass
- SUPERFLEX 500M: 10% by mass (content of resin in terms of solid content)
- Surfactant (product name, "OLFINE E1010", manufactured by Nissin Chemical Co., Ltd.): 0.5% by mass
- Water: 80.5% by mass <Image Recording>

In Example 201, image recording was performed by the same method as in Example 4 using the pretreatment liquid containing an aggregating agent and the cyan ink prepared in Example 4, thereby obtaining an image recorded material.

In Example 202, image recording was performed by the same method as in Example 101 using the pretreatment liquid containing an aggregating agent and the cyan ink and the white ink prepared in Example 101, thereby obtaining an image recorded material.

In Example 201, as a result of the evaluation performed in the same manner as in Example 4, the evaluation results were the same as in Example 4.

In Example 202, as a result of the evaluation performed in the same manner as in Example 101, the evaluation results were the same as in Example 101.

Example 301

A pretreatment liquid, a cyan ink, and a white ink were prepared by the same method as in Example 101.

<Image Recording>

Image recording was performed using the pretreatment liquid, the cyan ink, and the white ink prepared above. The image recording was performed by the same method as in Example 101 except that a drying step was provided after the application of the cyan ink. The specific procedures are as follows.

An ink jet recording device and the impermeable base material A were prepared in the same manner as in Example 101.

The impermeable base material A was coated with the pretreatment liquid using a wire bar coater such that the amount of the pretreatment liquid to be applied reached approximately 1.7 g/$m^2$, and the pretreatment liquid was dried at 50° C. for 2 seconds.

The cyan ink was jetted from the first ink jet head and applied in the form of a solid image while the impermeable base material A was continuously transported at 50 m/min using the ink jet recording device, and the cyan ink was dried with warm air at 80° C. for 15 seconds. The white ink was jetted from the second ink jet head and applied in the form of a solid image onto the applied cyan ink. A solid image was recorded by drying the applied white ink with warm air at 80° C. for 15 seconds, thereby obtaining an image recorded material.

In Example 301, as a result of the evaluation performed in the same manner as in Example 101, the evaluation results were the same as in Example 101.

The present disclosure of JP2021-185753 filed on Nov. 15, 2021 is incorporated herein by reference in its entirety. Further, all documents, patent applications, and technical standards described in the present specification are incorporated herein by reference to the same extent as in a case of being specifically and individually noted that individual documents, patent applications, and technical standards are incorporated by reference.

What is claimed is:

1. An ink jet ink set for an impermeable base material, comprising:

a pretreatment liquid that comprises water, an aggregating agent, and a urethane resin having a glass transition temperature of −55° C. to 50° C., wherein the urethane resin comprised in the pretreatment liquid has a breaking elongation of 300% to 1,300%; and a colored ink that comprises water, a pigment other than a white pigment, and a urethane resin, wherein the urethane resin comprised in the colored ink has a glass transition temperature of 50° C. or lower, wherein an absolute value of a difference between the glass transition temperature of the urethane resin comprised in the pretreatment liquid and the glass transition temperature of the urethane resin comprised in the colored ink is 50° C. or lower.

2. The ink jet ink set for an impermeable base material according to claim 1, wherein the urethane resin comprised in the colored ink is an anionic urethane resin.

3. The ink jet ink set for an impermeable base material according to claim 1, wherein the urethane resin comprised in the pretreatment liquid has a breaking elongation of 600% to 1,300%.

4. The ink jet ink set for an impermeable base material according to claim 1, further comprising:

a white ink that comprises water and a white pigment.

5. The ink jet ink set for an impermeable base material according to claim 4, wherein the white ink comprises a urethane resin.

6. The ink jet ink set for an impermeable base material according to claim 5, wherein the urethane resin comprised in the white ink has a glass transition temperature of 50° C. or lower.

7. The ink jet ink set for an impermeable base material according to claim 4, wherein an absolute value of a difference between a glass transition temperature of the urethane resin comprised in the colored ink and a glass transition temperature of a urethane resin comprised in the white ink is 50° C. or lower.

8. An image recording method using the ink jet ink set for an impermeable base material according to claim 1, the method comprising:

applying the pretreatment liquid onto an impermeable base material; and applying the colored ink onto the impermeable base material onto which the pretreatment liquid has been applied by an ink jet recording method.

9. An image recording method using the ink jet ink set for an impermeable base material according to claim 4, the method comprising:

applying the pretreatment liquid onto an impermeable base material; and applying the colored ink and the white ink onto the impermeable base material onto which the pretreatment liquid has been applied by an ink jet recording method.

10. A method of producing a laminate, comprising:

obtaining an image recorded material that includes the impermeable base material and an image disposed on the impermeable base material by the image recording method according to claim 8; and laminating a base material for lamination on a side of the image recorded material where the image is disposed, to obtain a laminate.

11. An image recorded material comprising:

an impermeable base material; and an image disposed on the impermeable base material, wherein the image includes a pretreatment layer disposed on the impermeable base material and comprising a urethane resin having a glass transition temperature of −55° C. to 50° C., and a colored ink layer disposed on the pretreatment layer and comprising a pigment other than a white pigment and a urethane resin.

12. The image recorded material according to claim 11, wherein the image further includes a white ink layer disposed on the colored ink layer and comprising a white pigment.

13. A laminate comprising:

the image recorded material according to claim 11; and a base material for lamination that is laminated on the image of the image recorded material.

* * * * *